E. E. MYER & O. P. HAWKINS.
SALT FEEDER FOR LIVE STOCK.
APPLICATION FILED MAY 18, 1911.

1,081,134.

Patented Dec. 9, 1913.

WITNESSES:
J. H. Gardner.
G. W. Poyner.

INVENTORS:
Elisha E. Myer,
Oscar P. Hawkins,
By E. T. Silvius,
ATTORNEY.

UNITED STATES PATENT OFFICE.

ELISHA E. MYER AND OSCAR P. HAWKINS, OF JACKSON TOWNSHIP, FAYETTE COUNTY, INDIANA.

SALT-FEEDER FOR LIVE STOCK.

1,081,134.   Specification of Letters Patent.   Patented Dec. 9, 1913.

Application filed May 18, 1911. Serial No. 628,001.

*To all whom it may concern:*

Be it known that we, ELISHA E. MYER and OSCAR P. HAWKINS, citizens of the United States, residing in Jackson township, in the county of Fayette and State of Indiana, have invented a new and useful Salt-Feeder for Live Stock, of which the following is a specification, reference being had to the accompanying drawings and to the letters and figures of reference marked thereon.

This invention relates to boxes or holders for salt that are designed to be set up in barn yards or in fields to enable live stock, such as cattle, horses or hogs, to readily obtain salt when desired, the invention having reference more particularly to an appliance of the above mentioned character that is adapted to keep the salt in good condition for use and avoid waste.

The object of the invention primarily is to provide a reliable and convenient salt feeder for live stock that will be adapted to be constructed at relatively small cost in factories or by parties requiring them, a further object being to provide a practically water tight salt feeder so constructed as to be adapted to be placed outside of buildings wherever needed and which will be durable and economical in use.

With the above mentioned and minor objects in view, the invention comprises a box having an inclined trough shaped bottom extending through the side wall thereof and into which the salt is fed as used by the animals, there being a gate to regulate the flow or feeding of the salt; and the invention consists further in the novel parts and combinations and arrangements of parts, as hereinafter particularly described and claimed.

Figure 1:
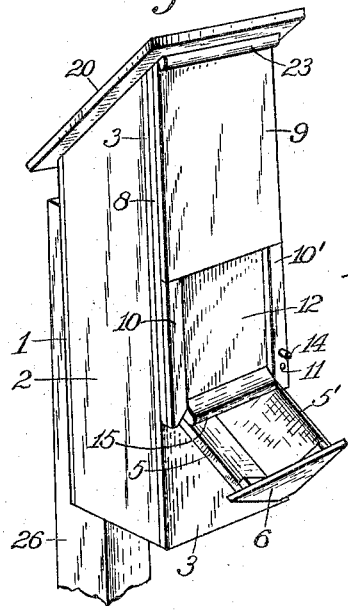
Figure 2:
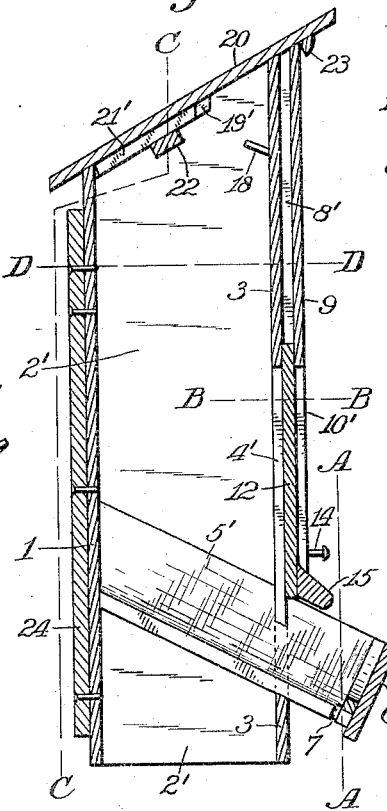
Figure 3:
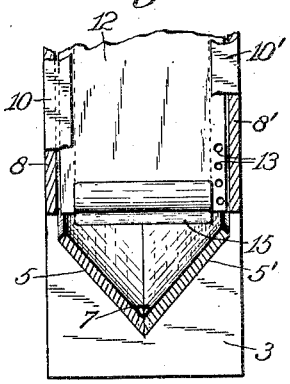
Figure 4:
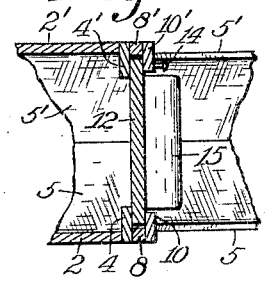
Figure 5:
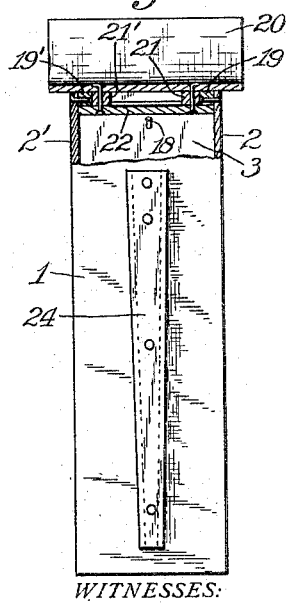
Figure 6:
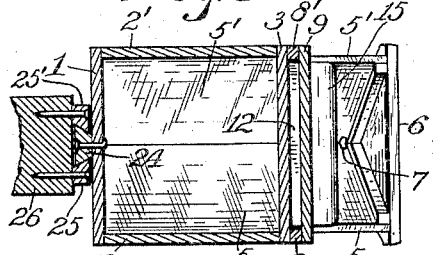
Figure 7:
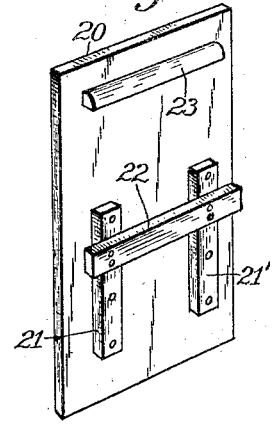
Figure 8:
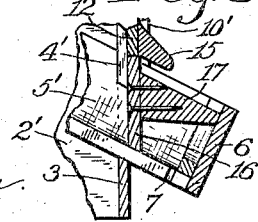

Referring to the drawings, Figure 1 is a perspective view of the improved salt feeder suitably supported for use; Fig. 2, a vertical transverse central sectional view thereof; Fig. 3, a fragmentary sectional elevation on the plane of the line A A in Fig. 2; Fig. 4, a fragmentary horizontal section on the line B B in Fig. 2; Fig. 5, a rear elevation of the salt feeder, partially in section, on the line C C in Fig. 2; Fig. 6, a horizontal section on the line D D in Fig. 2; Fig. 7, a perspective view of the removable roof of the feeder; and Fig. 8, a fragmentary sectional detail showing a device in position for preventing the outflow of the salt while filling the feeder.

In the various figures of the drawings similar reference characters indicate like elements or features of construction herein referred to.

The improved salt-feeder comprises a relatively tall and narrow receptacle adapted to be constructed of wooden boards and preferably is composed of a back 1, two sides 2 and 2' attached to the back, and a front 3 attached to the sides, the front being somewhat taller than the back and the upper ends of the sides being oblique or angled so that the upper edges of the sides are in an inclined plane extending from the upper end of the back to the upper end of the taller front. The front 3 is cut out so as to afford an opening therein at about and below the middle portion thereof, leaving two guide bars 4 and 4' extending vertically adjacent the front edges of the sides 2 and 2'. A trough-like bottom is provided which has two inclined sides 5 and 5' suitably secured together so as to be V-shaped in cross-section, the bottom extending from the back 1 downward through the opening in the front 3, the upper portions of the sides 5 and 5' being slotted to receive the guide bars 4 and 4'. The bottom projects sufficiently far beyond the front of the receptacle to constitute a relatively short salt-lick and is provided with a front or end-board 6 adjacent to which is a drain-hole 7 to permit rain-water to drip from the trough or salt-lick. Two side guides 8 and 8' are secured to the front 3 and extend from the upper end thereof down to the lower end of the opening in the front 3 forward of the front edges of the sides 2 and 2'. A weather-board 9 is secured at its edge portions to the side guides 8 and 8' and extends from the upper end of the opening in the front to the plane of the upper edges of the sides 2 and 2', being forward of the front 3, and two front guide bars 10 and 10' are secured to the side guides 8 and 8' and extend from the lower edge of the weatherboard downward to the lower ends of the side guides, the lower portion of the guide bar 10' having a suitable number of pin holes 11 therein. A gate 12 is mounted between the guide bars 4 and 4' and the front guide bars 10 and 10' and it extends upward between the front 3 and the weatherboard 9, the latter assisting in guiding the gate, and the gate is guided laterally by the side guides 8 and 8'. The door has a suitable number of pin holes 13 in the lower portion near one edge thereof to receive a pin 14 which may be inserted through one of the holes 11 for fixing the position of the gate as may be desired. Preferably the lower front portion of the gate is provided with a water-shed 15 to prevent rain from dashing onto the bottom within the receptacle.

A removable gate extension is provided that is adapted to fit into the V-shaped bottom of the receptacle under the gate 12 and it is provided with a prop 17 adapted to engage the inner side of the front 6 of the projecting trough, to hold the gate extension in place while salt is being poured into the top of the box or receptacle. The upper portion of the inner side of the front 3 is provided with a peg 18 upon which the gate extension may be hung when not in use, the extension being removed from the trough after the box is supplied with salt which becomes packed on the bottom so that it will remain in place after removal of the extension.

The upper portions of the sides 2 and 2' are provided with two inclined cleats 19 and 19' which are inclined to correspond to the inclination of the upper edges of the sides. A removable roof 20, which is adapted to cover the receptacle and extend beyond the back and sides and the weather-board and the under side of the roof, has two longitudinally extending guide-strips 21 and 21' thereon to which is secured a transverse lock bar 22 which extends laterally beyond the strips and against the under sides of the cleats 19 and 19' when the roof is in normal position, the roof being moved forwardly to withdraw the ends of the lock bar beyond the upper ends of the cleats so that the roof may be lifted from the receptacle. Preferably the under side of the roof is provided with a weather-strip 23 that normally rests against the front of the upper portion of the weather-board 9 to prevent rain-water from flowing against the under side of the roof and over the top of the weather-board and the front 3.

The outer side of the back 1 preferably is provided with a tapering key 24 which is narrower at its lower end than its upper end, the side edges of the key being oblique angled so that the back of the key which is adjacent the back 1 is narrower than the outer side or front of the key, and two strips 25 and 25' are provided, one side of each strip being oblique angled, and the narrower sides of the strips are placed against a post 26 and suitably secured thereto at the opposite sides of the key 24, so that the latter is dovetailed removably between the two strips. The post may be of suitable length to be adapted to be set into the ground and to support the salt-feeder at the desired height either for cattle, horses, or for hogs to enable them to lick the salt from the trough-like bottom of the receptacle.

In practical use the gate extension 16 is placed in position, and the roof 20 having been removed a quantity of salt is poured into the top of the receptacle, and the extension is removed. The cover is then placed in its normal position and the gate 12 may be raised more or less as may be desired, being usually elevated more for cattle or horses than when designed for the use of hogs or smaller animals. In some cases the pin 14 may be withdrawn entirely so that the animals may with their noses raise the gate sufficiently to enable them to reach the salt when necessary, but the gate may be secured in proper position by the pin supporting the gate sufficiently high to enable the animals to insert their noses under the gate and obtain sufficient salt.

Having thus described the invention, what is claimed as new, is—

1. In a salt-feeder for live stock, the combination with a box back and two sides secured to the back, of a front secured to the sides and having an opening therein below the middle portion and above the lower end thereof, portions of the opening forming two guide bars, a trough-like bottom extending from the back above the lower end thereof and downward through said opening and comprising two sides that are secured together at their lower edges and extend divergently upward, the upper portions of the sides of the bottom being slotted and receiving said guide bars, and an end board secured to the ends of said two bottom sides.

2. In a salt-feeder for live stock, the combination with a box back and two sides secured to the back, of a box front secured to the sides and having an opening therein, portions of the front at opposite sides of the opening forming two rear guide bars, a bottom extending from the back forward and downward through said opening and resting upon said front at the bottom of said opening, said bottom comprising two inclined parts the outer edge portions of which are slotted and receiving portions of said guide bars, two side guides secured to said guide bars, two front guide bars secured to said side guides, a weather-board secured to said side guides above said front guide bars, a gate movable between said front and rear guide bars and between said side guides and extending upward between said box front and said weather-board, and a watershed secured to the lower forward portion of said gate and normally resting upon the upper side edges of said bottom.

In testimony whereof, we affix our signatures in presence of two witnesses.

ELISHA E. MYER.
OSCAR P. HAWKINS.

Witnesses:
NEIEL McGLINCHEY,
A. T. BECKETT.